(12) United States Patent
Shi et al.

(10) Patent No.: US 12,503,968 B2
(45) Date of Patent: Dec. 23, 2025

(54) SCR SYSTEM AND ENGINE

(71) Applicant: WEICHAI POWER CO., LTD., Shandong (CN)

(72) Inventors: Dailong Shi, Shandong (CN); Fulin Wei, Shandong (CN); Peng Zheng, Shandong (CN); Jiayun Yang, Shandong (CN); Xiaoli Zhang, Shandong (CN); Chao Jiang, Shandong (CN); Yi Luo, Shandong (CN)

(73) Assignee: WEICHAI POWER CO., LTD., Shandong (CN)

( * ) Notice: Subject to any disclaimer, the term of this patent is extended or adjusted under 35 U.S.C. 154(b) by 0 days.

(21) Appl. No.: 18/730,297

(22) PCT Filed: Dec. 29, 2022

(86) PCT No.: PCT/CN2022/143611
§ 371 (c)(1),
(2) Date: Jul. 18, 2024

(87) PCT Pub. No.: WO2023/138342
PCT Pub. Date: Jul. 27, 2023

(65) Prior Publication Data
US 2025/0172084 A1    May 29, 2025

(30) Foreign Application Priority Data
Jan. 18, 2022   (CN) .......................... 202210056014.X (51) Int. Cl.
*F01N 3/20* (2006.01)
*B01F 25/40* (2022.01)
(Continued)

(52) U.S. Cl.
CPC ............... *F01N 3/208* (2013.01); *F01N 3/28* (2013.01); *B01F 25/40* (2022.01); *B01F 25/42* (2022.01);
(Continued)

(58) Field of Classification Search
CPC combination set(s) only.
See application file for complete search history.

(56) References Cited

U.S. PATENT DOCUMENTS

| | | | |
|---|---|---|---|
| 8,459,017 B2 * | 6/2013 | Paterson | F01N 3/025 60/262 |
| 2009/0178395 A1 * | 7/2009 | Huffmeyer | F01N 3/2033 60/303 |

(Continued)

FOREIGN PATENT DOCUMENTS

| | | |
|---|---|---|
| CN | 107438705 A | 12/2017 |
| CN | 109488426 A | 3/2019 |

(Continued)

OTHER PUBLICATIONS

International Search Report for PCT/CN2022/143611 mailed Mar. 18, 2023, ISA/CN.

*Primary Examiner* — Binh Q Tran
(74) *Attorney, Agent, or Firm* — Yue (Robert) Xu; Apex Attorneys at Law, LLP (57) ABSTRACT

An SCR system includes a box body, a urea nozzle and a mixer. The mixer is arranged inside the box body, and is cylindrical, and the first end of the mixer faces the urea nozzle. The mixer comprises a check ring, a swirl tube and a perforated pipe which are connected in sequence. The check ring is arranged close to the urea nozzle, and is provided with a plurality of first through holes. Multiple second through holes are formed in the swirl tube, and multiple third through holes are formed in the perforated pipe. The mixer further comprises a retaining ring, an inner (Continued)

ring of the retaining ring is connected to an outer wall of the swirl tube and/or the perforated pipe, and an outer ring of the retaining ring is connected to an inner wall of the box body. Also provided is an engine.

16 Claims, 5 Drawing Sheets

(51) Int. Cl.
  *B01F 25/42* (2022.01)
  *B01F 25/431* (2022.01)
  *B01F 25/433* (2022.01)
  *F01N 1/08* (2006.01)
  *F01N 3/28* (2006.01)

(52) U.S. Cl.
  CPC ......... *B01F 25/431* (2022.01); *B01F 25/4331* (2022.01); *F01N 1/086* (2013.01); *F01N 1/087* (2013.01); *F01N 1/088* (2013.01); *F01N 3/206* (2013.01); *F01N 3/2066* (2013.01); *F01N 3/2892* (2013.01); *F01N 2240/20* (2013.01); *F01N 2610/08* (2013.01); *F01N 2900/1411* (2013.01)

(56) References Cited

U.S. PATENT DOCUMENTS

| | | | |
|---|---|---|---|
| 2015/0071825 A1* | 3/2015 | Sampath | B01D 53/92 422/168 |
| 2016/0032809 A1 | 2/2016 | Kobe et al. | |
| 2016/0061078 A1 | 3/2016 | Schmidt et al. | |
| 2016/0076430 A1* | 3/2016 | Freeman | F16B 2/08 248/230.8 |
| 2017/0114693 A1* | 4/2017 | Stelzer | B01D 53/9418 |
| 2018/0030874 A1 | 2/2018 | Gehrlein et al. | |
| 2019/0101037 A1* | 4/2019 | Golin | F01N 3/2892 |
| 2022/0341357 A1* | 10/2022 | Chauvin | F01N 3/2892 |

FOREIGN PATENT DOCUMENTS

| | | |
|---|---|---|
| CN | 208578613 U | 3/2019 |
| CN | 114542248 A | 5/2022 |
| DE | 102014112651 A1 | 3/2016 |

* cited by examiner

SCR SYSTEM AND ENGINE

The present application is a National Phase entry of PCT Application No. PCT/CN2022/143611, filed on Dec. 29, 2022, which claims the priority to Chinese Patent Application No. 202210056014.X, titled "SCR SYSTEM AND ENGINE", filed with the China National Intellectual Property Administration on Jan. 18, 2022, the entire disclosures of which are incorporated herein by reference.

FIELD

The present application relates to the technical field of engines, and in particular to an SCR system. The present application also relates to an engine.

BACKGROUND

Contents provided in this part are merely background information related to the present application, and are not necessarily the prior art.

The basic principle of SCR (Selective Catalytic Reduction) technology is to inject fuel or add other reductant to exhaust gas, select a proper catalyst to promote a reaction between the reductant and $NO_x$, and suppress oxidation of the reductant by oxygen in the exhaust gas at the same time. The urea SCR technology, which employs $NH_3$ produced by decomposition of the urea as the reductant, is relatively mature and is widely used in practice. A conventional urea SCR system is generally provided with a mixer, which is used to mix a urea spray with the exhaust gas of an engine. However, due to a limitation of its own structure, the conventional mixer has a problem that the urea hits a wall and crystallizes too early, and the mixing uniformity is poor.

SUMMARY

An object of the present application is to at least solve the problems in the prior art that urea crystallizes too early, and the mixing uniformity is poor. To achieve this object, the following technical solutions are provided.

In a first aspect of the present application, an SCR system is provided. The SCR system includes a box body, a urea nozzle and a mixer, the mixer is arranged inside the box body, and the mixer is of a cylinder shape; a first end of the mixer faces the urea nozzle, and a second end of the mixer is configured to discharge mixed gas; the mixer includes a baffle ring, a swirl tube and a perforated tube that are connected in sequence, and the baffle ring is arranged close to the urea nozzle; the baffle ring is provided with multiple first through holes, the swirl tube is provided with multiple second through holes, and the perforated tube is provided with multiple third through holes; and the mixer includes an annular baffle, an inner circumference of the annular baffle is connected to an outer wall of the swirl tube and/or an outer wall of the perforated tube, and an outer circumference of the annular baffle is connected to an inner wall of the box body.

The SCR system according to the present application has the mixer structure including the baffle ring, the swirl tube, the annular baffle and the perforated tube. Under collaborative actions of the above structures, urea droplets can be sufficiently mixed with exhaust gas, crushed, bumped into the wall, peeled off, evaporated and decomposed, such that the mixing uniformity of $NH_3$ and the anti-crystallization performance of the after-treatment system can be improved, thereby solving the problem of urea crystallization during after-treatment process of the SCR system when an engine works in an operating condition of a low speed and small load.

Moreover, modular design of the structure may be realized according to the present application, and is applied onto engines with various displacements. An inner diameter of the mixer, the structure of the swirl tube, the size and number of holes of the perforated tube are reasonably fine-tuned according to after-treatments of different specifications, so as to perfectly match the engines. There is no complicated connection or mounting structure, therefore the reliability is high.

In addition, the SCR system according to the present application may further have the following additional technical features.

In some embodiments, the swirl tube includes a swirl tube body and multiple swirl fins, the swirl tube body is of a cylinder shape, and two ends of the swirl tube body are connected to the baffle ring and the perforated tube respectively, the multiple second through holes are provided on the swirl tube body, and the multiple swirl fins are in one-to-one correspondence to the multiple second through holes; and a first end of each of the multiple swirl fins is connected to the swirl tube body, and a second end of each of the multiple swirl fins extends outwards along a radial direction of the swirl tube body in an inclined manner.

In some embodiments, an inclined angle of each of a first part of the multiple swirl fins is smaller than an inclined angle of each of a second part of the multiple swirl fins, and the first part of the multiple swirl fins are located upstream of the second part of the multiple swirl fins along a flow direction of the gas.

In some embodiments, each of the multiple swirl fins is of an arc shape, and the first end of the swirl fin extends inwards along the radial direction of the swirl tube body in an inclined manner and extends into the swirl tube body.

In some embodiments, the multiple third through holes includes a multiple round holes and a multiple elongated holes, and a first end of the perforated tube is connected to the swirl tube, the multiple round holes are distributed in an array and close to the first end of the perforated tube, and the multiple elongated holes are distributed in an array and close to a second end of the perforated tube.

In some embodiments, the multiple round holes are arranged in a staggered manner along a circumferential direction of the perforated tube.

In some embodiments, the multiple elongated holes are evenly distributed along an axial direction and the circumferential direction of the perforated tube.

In some embodiments, each of the multiple first through holes is of an elongated shape, and a length direction of the first through hole is the same as a circumferential direction of the baffle ring.

In some embodiments, the annular baffle is provided with multiple fourth through holes, each of the multiple fourth through holes is of an elongated shape, and a center line of the fourth through hole is an arc line.

In a second aspect of the present application, an engine is provided, including the SCR system provided in the first aspect of the present application.

The engine provided in the second aspect of the present application has the same beneficial effects as the SCR system provided in the first aspect of the present application, which is not described herein.

BRIEF DESCRIPTION OF THE DRAWINGS

By reading the detailed description of the preferred embodiments hereinafter, various advantages and benefits will become clear to those skilled in the art. The accompanying drawings are only intended to illustrate the preferred embodiments and are not intended to limit the present application. Moreover, same reference numerals denote same components in all the accompanying drawings.

REFERENCE NUMERALS

| 10 | box body, | 20 | baffle ring, |
|---|---|---|---|
| 201 | first through hole, | 21 | swirl tube, |
| 211 | swirl tube body, | 212 | swirl fin, |
| 22 | perforated tube, | 221 | round hole, |
| 222 | elongated hole, | 23 | annular baffle, |
| 231 | fourth through hole. | | |

DETAILED DESCRIPTION OF THE EMBODIMENTS

The exemplary embodiments of the present application will be described more specifically hereinafter with reference to the accompanying drawings. Although the exemplary embodiments of the present application are shown in the drawings, it should be understood that the present application may be implemented in various forms and should not be limited by the embodiments described herein. On the contrary, these embodiments are intended to provide a more thorough understanding of the present application and to fully convey the scope of the present application to those skilled in the art.

It should be understood that, the terms used in the context are only for the purpose of describing specific exemplary embodiments and are not intended to limit. Unless otherwise explicitly stated in the context, a singular form such as "a", "an", and "the" used in the text can also indicate the inclusion of a plural form. The terms "comprising", "including", "containing", and "having" are inclusive and therefore indicate the existence of the described features, steps, operations, elements, and/or components, but do not exclude the existence or addition of one or more other features, steps, operations, elements, components, and/or their combinations. The methods, steps, processes, and operations described in the text are not interpreted as requiring them to be executed in the specific order described or explained, unless the order of execution is clearly indicated. It should also be understood that additional or alternative steps may be used.

Although the terms first, second, third and so on can be used in the text to describe multiple elements, components, regions, layers, and/or sections, these elements, components, regions, layers, and/or sections should not be limited by these terms. These terms may be used only to distinguish one element, component, region, layer, or section from another region, layer, or section. Unless explicitly stated, terms such as "first", "second", and other numerical terms used in the text do not imply order or sequence. Therefore, the elements, components, regions, layers, or sections discussed below may be referred to as second element, second component, second region, second layer, or second section without departing from the teachings of exemplary embodiments.

For ease of description, spatial relative relationship terms may be used in the text to describe the relationship between one element or one feature as shown in figures and another element or feature. These relative relationship terms are, for example, "internal", "external", "inside", "side", "under", "below", "on", "above", etc. These spatial relative relationship terms refer to various orientations of devices in use or operation, excluding those depicted in the diagram. For example, if the device in the figure is turned over, an element described as "being under other elements or features" or "being below other elements or features" will then be oriented as "being on other elements or features" or "being above other elements or features". Therefore, the example term "below" may include orientations both of being above and of being below. The device may be further oriented separately (being rotated 90 degrees or being in other directions) and the spatial relative relationship descriptors used in the text are explained accordingly.

As shown in FIGS. 1 to 4, an SCR system is provided in a first aspect of the present application. The SCR system includes a box bod 10, a urea nozzle and a mixer. The mixer is arranged inside the box body 10, and the mixer is of a cylinder shape. A first end of the mixer faces the urea nozzle, and a second end of the mixer is configured to discharge mixed gas. The mixer includes a baffle ring 20, a swirl tube 21 and a perforated tube 22 that are connected in sequence, and the baffle ring 20 is arranged close to the urea nozzle. The baffle ring 20 is provided with multiple first through holes 201, the swirl tube 21 is provided with multiple second through holes, and the perforated tube 22 is provided with multiple third through holes. The mixer further includes an annular baffle 23. An inner circumference of the annular baffle 23 is connected to an outer wall of the swirl tube 21 and/or an outer wall of the perforated tube 22, and an outer circumference of the annular baffle 23 is connected to an inner wall of the box body 10.

Figure 1:
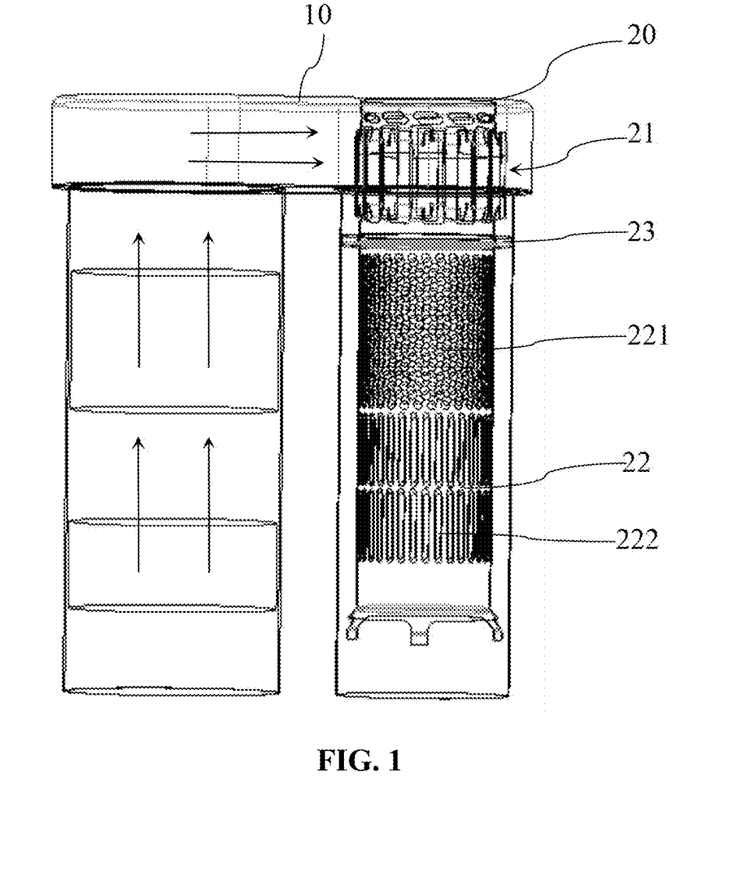
FIG. 1 is a schematic view showing the structure of an SCR system according to an embodiment of the present application.
Figure 2:
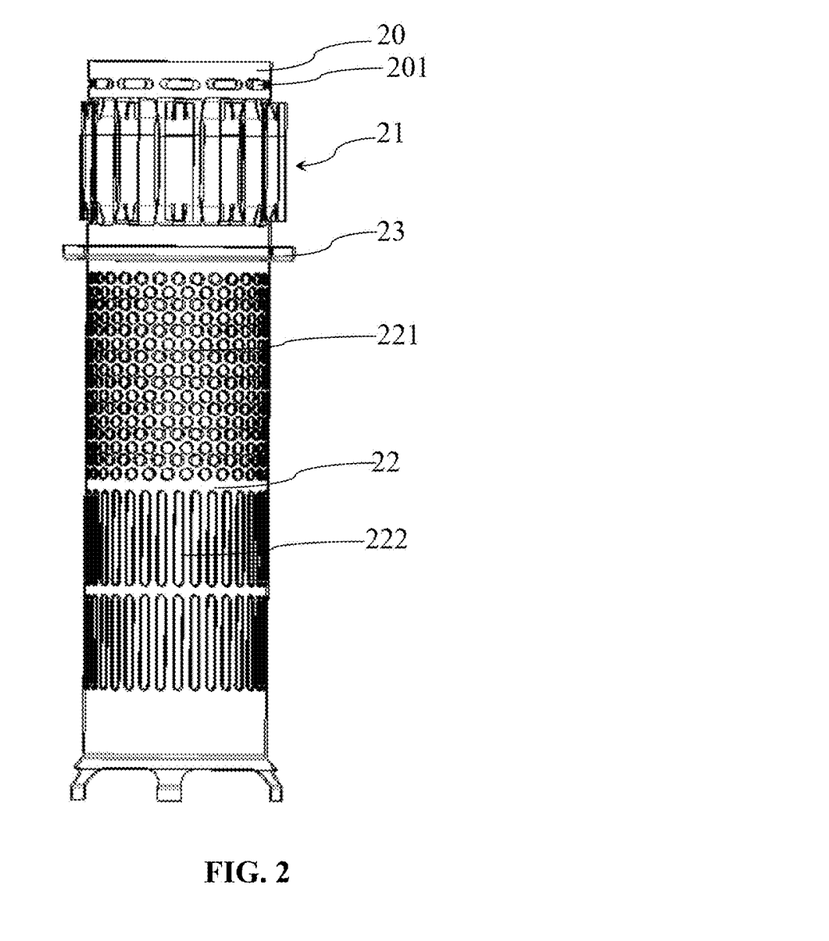
FIG. 2 is a schematic view showing the structure of a mixer according to an embodiment of the present application.

It should be noted that, the box body 10 of the SCR system may be of a straight cylinder shape or may be U-shaped. A cavity is provided inside the box body 10, and the mixer and a carrier of the SCR system are mounted inside the cavity. The box body 10 is provided with a nozzle port exactly facing a top portion of the mixer. The urea nozzle is mounted at the nozzle port for injecting urea spray. The entire mixer is of a cylinder shape, thus the baffle ring 20, the swirl tube 21 and the perforated tube 22, namely subassemblies of the mixer, are each of a cylinder shape.

The baffle ring 20 is arranged close to the urea nozzle. A first function of the baffle ring 20 is to block the urea spray and isolate the urea spray from an exhaust gas flow, so as to prevent an initial jet injected by the nozzle from being blown and deflected by the high-speed gas flow. A second function is to facilitate flowing of the gas in this region by the first through holes 201, so as to prevent a dead zone or a circulation region of the gas flow from forming in a nozzle seat region, thereby preventing the urea from crystallizing in the nozzle seat region. A third function is to weaken the swirl effect of the jet at the initial stage, so as to prevent urea droplets from bumping into a wall and crystallizing too early.

Figure 3:
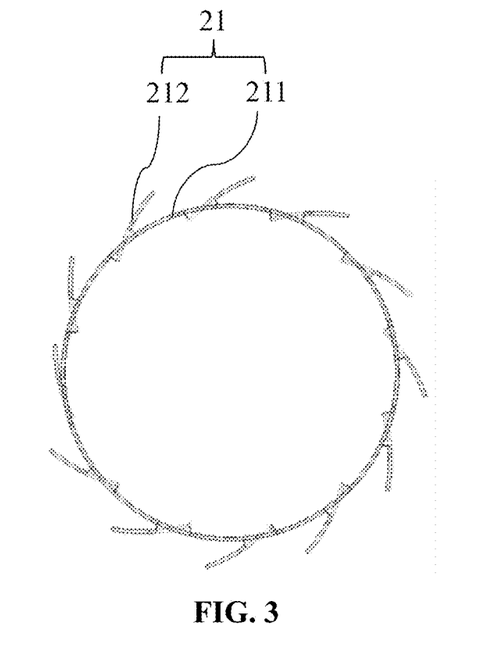
FIG. 3 is a schematic view showing the structure of a swirl tube according to an embodiment of the present application.

A function of the swirl tube 21 is to make the gas flowing therein swirl at a high speed and entrain the urea droplets to swirl and flow downwards, such that the urea solution is sufficiently mixed with the exhaust gas, evaporated and decomposed, and therefore the total number of the droplets bumping into the wall is decreased, thereby significantly reducing a risk of urea crystallization. To achieve the above object, the swirl tube 21 is designed to have a cyclone structure. That is, the swirl tube 21 is provided with openings and deflectors. The deflectors are designed to have such a form that the exhaust gas flowing through the swirl tube 21 forms a swirl, and the openings may be round holes or rectangular holes, which are not limited herein.

A function of the perforated tube 22 is to make the swirling gas flowing from the swirl fins 212 above to flow out, and flow into the perforated tube 22 after being bounced back by the inner wall of the box body 10. During interaction between an inner layer and an outer layer of the gas flow, the urea solution is mixed with the exhaust gas, evaporated and decomposed again.

Figure 4:
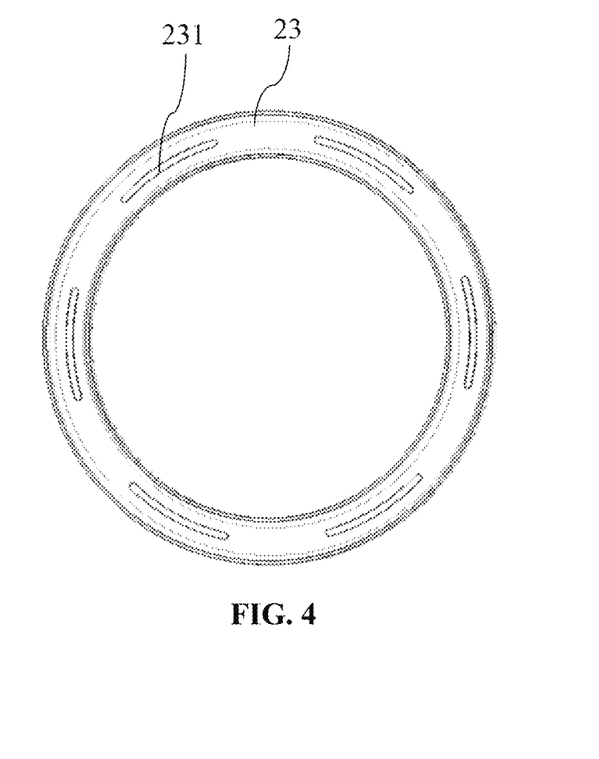
FIG. 4 is a schematic view showing the structure of an annular baffle according to an embodiment of the present application.

A first function of the annular baffle 23 is to fix the mixer by connecting a main part of the mixer to the box body 10, so as to improve reliability of assembling thereof. A second function is to block a gas channel between the mixer and the box body 10 to force the gas to completely flow downwards through the swirl tube 21, thereby increasing the utilization of the swirl tube 21. Therefore, after being guided by the swirl tube 21, the exhaust gas flow forms the high-speed swirl to entrain the urea droplets to swirl and flow downwards.

The SCR system according to the present application has the mixer structure including the baffle ring 20, the swirl tube 21, the annular baffle 23 and the perforated tube 22. Under collaborative actions of the above structures, the urea droplets injected by the urea nozzle are guided by the baffle ring 20, and are mixed with the exhaust gas flow from a diesel particulate filter to generate the mixed gas at the swirl part. Being swirled at a high speed by the deflector structure of the swirl tube, the mixed gas swirls and flows downwards, and is further mixed by the perforated tube 22. At last, the mixed gas is discharged, flows to the carrier and a catalyst of the SCR system for further reaction. The exhaust gas and the urea can be sufficiently mixed, crushed, bumped into the wall, peeled off, evaporated and decomposed inside the mixer, such that the mixing uniformity of $NH_3$ and the anti-crystallization performance of the after-treatment system are improved, thereby solving the problem of urea crystallization during after-treatment process of the SCR system when the engine works in an operating condition of a low speed and small load.

Figure 5:
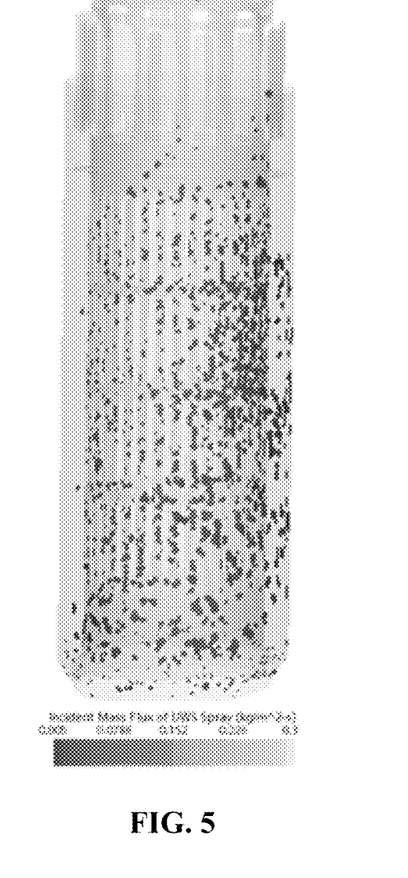
FIG. 5 is a cloud diagram of the mixer according to the embodiment of the present application simulated in CFD software.

As shown in FIG. 5, the mixer according to the present application is modeled and simulated by CFD (computational fluid dynamics) software. It can be seen that, the droplets bumping into the wall are reduced, and therefore the problem that the urea bumps into the wall and crystallized is alleviated to some extent.

Moreover, modular design of the structure may be realized according to the present application, and is applied to engines with various displacements. An inner diameter of the mixer, the structure of the swirl tube 21, the size and number of holes of the perforated tube 22 are reasonably fine-tuned according to after-treatments of different specifications, to perfectly match the engines. There is no complicated connection or mounting structure, therefore the reliability is high.

In some embodiments of the present application, the swirl tube 21 includes a swirl tube body 211 and a multiple swirl fins 212. The swirl tube body 211 is of a cylinder shape, and two ends of the swirl tube body 211 are connected to the baffle ring 20 and the perforated tube 22 respectively. The swirl tube body 211 is provided with the multiple second through holes, and the multiple swirl fins 212 are in one-to-one correspondence to the multiple second through holes. A first end of each of the multiple swirl fins 212 is connected to the swirl tube body 211, and a second end of each of the multiple swirl fins 212 extends outwards along a radial direction of the swirl tube body 211 in an inclined manner.

The multiple swirl fins 212 include 12 fins that are evenly distributed along a circumferential direction and are distributed at a certain angle. A function of the swirl fins 212 is to make the gas flowing therein swirl at a high speed and entrain the urea droplets to swirl and flow downwards, such that the urea solution is sufficiently mixed with the exhaust gas, evaporated and decomposed, and therefore the total number of the droplets bumping into the wall is decreased, thereby significantly reducing a risk of urea crystallization.

In some embodiments of the present application, an inclined angle of each of a first part of the multiple swirl fins 212 is smaller than an inclined angle of each of a second part of multiple swirl fins 212, and the first part of the multiple swirl fins 212 are located upstream of the second part of the multiple swirl fins 212 along a flow direction of the gas.

As shown in FIG. 3, among the multiple swirl fins 212, one swirl fin 212 exactly facing the exhaust gas flow has a smaller inclined angle (smaller than 10 degrees in general) than other swirl fins 212, and the other swirl fins 212 have a same inclined angle. Since the swirl fin 212 exactly facing the gas flow has the relatively small angle, the opening is relatively small, and the swirl fin 212 itself can block the exhaust gas flow, so as to prevent the gas flow from directly entering the tube, blowing and deflecting the urea jet, thereby preventing the jet from intensively bumping into an inner wall of the swirl tube 21 too early, or passing through the swirl tube 21, bumping into the inner wall of the box body 10, attaching thereto and crystallizing, when the jet is swirling and flowing downwards together with the gas flow. On the contrary, after being blocked by the swirl fin 212, the gas flow enters from both sides of the swirl fin 212, entrains the urea to swirl and flow downwards. The urea droplets not evaporated and decomposed in the gas evenly bumps into the entire swirl tube 21, thereby increasing an evaporation area of the urea hitting the wall to some extent, which significantly reduce the risk of crystallization.

In some embodiments of the present application, each of the multiple swirl fins 212 is of an arc shape, and the first end of each swirl fin 212 extends inwards along the radial direction of the swirl tube body 211 in an inclined manner and extends into the swirl tube body 211. The swirl fin 212 of the arc shape has a good gas guiding performance. One end of the swirl fin 212 extends into the swirl tube 21, which also enhances the gas guiding performance, makes the gas flow to sufficiently flow into the swirl tube 21, thereby preventing a flow dead zone or urea crystals from forming at a connection position between the swirl fins 212 and the swirl tube body 211.

In some embodiments of the present application, the multiple third through holes includes multiple round holes 221 and multiple elongated holes 222. A first end of the perforated tube 22 is connected to the swirl tube 21, the multiple round holes 221 are distributed in an array and close to the first end of the perforated tube 22, and the multiple elongated holes 222 are distributed in an array and close to a second end of the perforated tube 22.

The perforated tube 22 is made up of two segments, namely an upper segment with the round holes 221, and a lower segment with the elongated holes 222 which are vertical. The elongated holes 222 themselves have a better anti-crystallization performance than the round holes 221. However, the swirling gas flow entraining the urea droplets to flow downwards may firstly pass through the openings at the upper segment of the perforated tube 22 and bump into the inner wall of the box body 10. If the openings at the upper segment are the elongated holes 222, the urea droplets hitting the inner wall of the box body 10 may concentrate too much, while the speed of the gas flow between the box body 10 and the perforated tube 22 is relatively low. As a result, the urea droplets hitting the inner wall of the box body 10 accumulate continuously, and form crystals on the inner wall of the box body 10. On the contrary, if openings at the upper segment are the round holes 221, the urea droplets passing through the upper segment of the perforated tube 22 first and bumping into the inner wall of the box body 10 may not be too concentrated since the round holes 221 has dispersion and crushing effects. In this way, under the action of the gas flow, the urea droplets are peeled off or evaporated and decomposed, thereby reducing the risk of crystallization on the inner wall of the box body 10 at the upper segment.

Specifically, the round holes 221 are arranged in a staggered manner along a circumferential direction of the perforated tube 22, so as to prevent the urea droplets hitting the inner wall of the box body 10 from being too concentrated, and to reduce the risk of crystallization on the tube wall of an outer layer at the upper segment. The elongated holes 222 are evenly distributed along an axial direction and the circumferential direction of the perforated tube 22. The elongated holes 222 themselves have a better anti-crystallization performance than the round holes 221, thereby further improving the anti-crystallization ability.

In some embodiments of the present application, each of the multiple first through holes 201 is of an elongated shape, and a length direction of the first through hole 201 is the same as a circumferential direction of the baffle ring 20. Two ends of each of the elongated holes are arc-shaped, which brings a better flowing performance to the gas flow, and prevents a flow dead zone or urea crystals from forming at this place.

In some embodiments of the present application, the annular baffle 23 is provided with multiple fourth through holes 231. Each of the multiple fourth through holes 231 is of an elongated shape, and a center line of the fourth through hole 231 is an arc line. Multiple arc-shaped elongated holes may be distributed on the annular baffle 23. A part of the gas flow enters the channel between an inner layer and an outer layer of the tube through the elongated holes, thereby facilitating the urea droplets attached on the tube wall of the outer layer being peeled off, evaporated and decomposed, to reduce the risk of crystallization on the tube wall of the outer layer.

In a second aspect of the present application, an engine is provided, including the SCR system provided in the first aspect of the present application.

The engine provided in the second aspect of the present application has the same beneficial effects as the SCR system provided in the first aspect of the present application, which is not described herein.

Above are only preferred specific embodiments of the present application. However, the protection scope of the present application is not limited thereto. Any variations or substitutions that can be easily thought of by those skilled in the art within the technical scope disclosed in the present application should be included in the protection scope of the present application. Therefore, the protection scope of the present application shall be subject to the protection scope of the claims.

What is claimed is:

1. An SCR system, comprising a box body, a urea nozzle and a mixer, wherein
   the mixer is arranged inside the box body, and the mixer is of a cylinder shape;
   a first end of the mixer faces the urea nozzle, and a second end of the mixer is configured to discharge a mixed gas;
   the mixer comprises a baffle ring, a swirl tube and a perforated tube that are connected in sequence, and the baffle ring is arranged close to the urea nozzle;
   the baffle ring is provided with a plurality of first through holes, the swirl tube is provided with a plurality of second through holes, and the perforated tube is provided with a plurality of third through holes; and
   the mixer comprises an annular baffle, an inner circumference of the annular baffle is connected to an outer wall of the swirl tube and/or an outer wall of the perforated tube, and an outer circumference of the annular baffle is connected to an inner wall of the box body,
   wherein the swirl tube comprises a swirl tube body and a plurality of swirl fins;
   the swirl tube body is of a cylinder shape, and two ends of the swirl tube body are connected to the baffle ring and the perforated tube respectively;
   the plurality of second through holes are provided on the swirl tube body, and the plurality of swirl fins are in one-to-one correspondence to the plurality of second through holes; and
   a first end of each of the plurality of swirl fins is connected to the swirl tube body, and a second end of each of the plurality of swirl fins extends outwards along a radial direction of the swirl tube body in an inclined manner.

2. The SCR system according to claim 1, wherein an inclined angle of each of a first part of the plurality of swirl fins is smaller than an inclined angle of each of a second part of the plurality of swirl fins, and the first part of the plurality of swirl fins are located upstream of the second part of the plurality of swirl fins along a flow direction of the gas.

3. The SCR system according to claim 1, wherein each of the plurality of swirl fins is of an arc shape, and the first end of the swirl fin extends inwards along the radial direction of the swirl tube body in an inclined manner and extends into the swirl tube body.

4. The SCR system according to claim 1, wherein
   the plurality of third through holes comprises a plurality of round holes and a plurality of elongated holes, and a first end of the perforated tube is connected to the swirl tube; and
   the plurality of round holes are distributed in an array and close to the first end of the perforated tube, and the plurality of elongated holes are distributed in an array and close to a second end of the perforated tube.

5. The SCR system according to claim 4, wherein the plurality of round holes are arranged in a staggered manner along a circumferential direction of the perforated tube.

6. The SCR system according to claim 4, wherein the plurality of elongated holes are evenly distributed along an axial direction and a circumferential direction of the perforated tube.

7. The SCR system according to claim 1, wherein each of the plurality of first through holes is of an elongated shape, and a length direction of the first through hole is the same as a circumferential direction of the baffle ring.

8. The SCR system according to claim 1, wherein the annular baffle is provided with a plurality of fourth through holes, each of the plurality of fourth through holes is of an elongated shape, and a center line of the fourth through hole is an arc line.

9. An engine, comprising the SCR system according to claim 1.

10. The SCR system according to claim 2, wherein each of the plurality of first through holes is of an elongated shape, and a length direction of the first through hole is the same as a circumferential direction of the baffle ring.

11. The SCR system according to claim 3, wherein each of the plurality of first through holes is of an elongated shape, and a length direction of the first through hole is the same as a circumferential direction of the baffle ring.

12. The SCR system according to claim 2, wherein the annular baffle is provided with a plurality of fourth through holes, each of the plurality of fourth through holes is of an elongated shape, and a center line of the fourth through hole is an arc line.

13. The SCR system according to claim 3, wherein the annular baffle is provided with a plurality of fourth through holes, each of the plurality of fourth through holes is of an elongated shape, and a center line of the fourth through hole is an arc line.

14. The SCR system according to claim 4, wherein the annular baffle is provided with a plurality of fourth through holes, each of the plurality of fourth through holes is of an elongated shape, and a center line of the fourth through hole is an arc line.

15. The SCR system according to claim 5, wherein the annular baffle is provided with a plurality of fourth through holes, each of the plurality of fourth through holes is of an elongated shape, and a center line of the fourth through hole is an arc line.

16. The SCR system according to claim 6, wherein the annular baffle is provided with a plurality of fourth through holes, each of the plurality of fourth through holes is of an elongated shape, and a center line of the fourth through hole is an arc line.

* * * * *